(12) United States Patent
Kim et al.

(10) Patent No.: US 9,190,646 B2
(45) Date of Patent: Nov. 17, 2015

(54) RECHARGEABLE BATTERY

(75) Inventors: Jun-Sik Kim, Yongin-si (KR);
Tae-Keun Kim, Yongin-si (KR);
Sae-Weon Roh, Yongin-si (KR);
Sung-Soo Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 861 days.

(21) Appl. No.: 12/966,863

(22) Filed: Dec. 13, 2010

(65) Prior Publication Data

US 2011/0223448 A1 Sep. 15, 2011

(30) Foreign Application Priority Data

Mar. 11, 2010 (KR) .................. 10-2010-0021799

(51) Int. Cl.
*H01M 2/02* (2006.01)
*H01M 2/12* (2006.01)
*H01M 2/10* (2006.01)

(52) U.S. Cl.
CPC .......... *H01M 2/1229* (2013.01); *H01M 2/1061* (2013.01); *H01M 2/1072* (2013.01); *H01M 2/1288* (2013.01)

(58) Field of Classification Search
CPC ....................................................... H01M 2/02
USPC .................................................. 429/53, 163
See application file for complete search history.

(56) References Cited

U.S. PATENT DOCUMENTS 6,461,757 B1   10/2002   Sasayama et al.

FOREIGN PATENT DOCUMENTS

| JP | 10-055792 | 2/1998 |
|---|---|---|
| JP | 2003-132868 | 5/2003 |
| JP | 2004-234899 | 8/2004 |
| JP | 2005-203262 | * 7/2005 |
| JP | 2006-318752 | 11/2006 |
| JP | 2006-332009 | 12/2006 |
| JP | 2007-087922 | 4/2007 |
| KR | 10-0670438 | 1/2007 |
| KR | 10-0719736 | 5/2007 |
| KR | 10-2008-0011477 | 2/2008 |
| KR | 10-2008-0036257 | 4/2008 |

OTHER PUBLICATIONS

KIPO Office action dated Jun. 17, 2011, for Korean priority Patent application 10-2010-0021799, 4 pages.
Patent Abstracts of Japan, and English machine translation of Japanese Publication 2007-087922, 50 pages.
Machine English Translation of JP 2006-332009, 16 pages.
Korean Patent Office Notice of Allowance dated May 18, 2012 for corresponding Korean Patent Application No. 10-2010-0021799, 5 pages.

* cited by examiner

*Primary Examiner* — Ula Ruddock
*Assistant Examiner* — Jacob Marks
(74) *Attorney, Agent, or Firm* — Christie, Parker & Hale, LLP

(57) ABSTRACT

A rechargeable battery including: an electrode assembly; and a case including a receiving portion to house the electrode assembly, a junction portion disposed around the receiving portion, formed by bonded films of the case, and gas outlet disposed in the junction portion. The gas outlet includes a first block portion, a second block portion, and a buffering space disposed between the first and second block portions.

14 Claims, 9 Drawing Sheets

RECHARGEABLE BATTERY

CROSS-REFERENCE TO RELATED APPLICATION

This application claims the benefit of Korean Patent Application No. 10-2010-0021799, filed on Mar. 11, 2010, in the Korean Intellectual Property Office, the disclosure of which is incorporated herein, by reference.

BACKGROUND

1. Field

The described technology relates generally to rechargeable batteries.

2. Description of the Related Art

A rechargeable battery with low capacity is used for small portable electronic devices, such as mobile phones, laptop computers, and camcorders. On the other hand, a rechargeable battery with high capacity can be used as a power source for driving a motor of a hybrid electric automobile and the like, or as a large-capacity power storage device.

High power rechargeable batteries have been recently developed that include a non-aqueous electrolyte and have a high energy density. A plurality of these rechargeable batteries can be coupled in series, to form a large capacity battery module for a device having high power requirements (e.g., a motor in an electric vehicle).

A rechargeable battery includes: an electrode assembly having a positive electrode, a negative electrode, and a separator disposed between the positive and negative electrodes; and a case in which the electrode assembly is installed. The case may have various structures, such as a pouch-type case, a metal case, or a polymer case. The pouch-type case has a structure in which film members are bonded to each other, and an electrode assembly is inserted between the bonded film members. The pouch-type case has a simple structure, so that it can be easily manufactured. However, a safety device may be difficult to install, because the structure thereof may be difficult to modify.

The above information disclosed in this Background section is only for enhancement of understanding of the background of the described technology and, therefore, it may contain information that does not constitute prior art.

SUMMARY

The described technology has been made in an effort to provide a rechargeable battery having improved safety characteristics.

A rechargeable battery, according to an exemplary embodiment of the present invention, includes an electrode assembly and a case. The case includes: a receiving portion to house the electrode assembly; a junction portion disposed around the receiving portion, formed by bonding edges of the case; and a gas outlet disposed in the junction portion. The gas outlet includes a first block portion, a second block portion, and a buffering space formed between the first and second block portions.

According to various embodiments, the case may be formed of films bonded together at the junction portion and the gas outlet. The width of the first block portion is larger than the width of the second block portion. A sealing layer may be disposed in the junction portion. Portions of the sealing layer may form in the first and second block portions. The buffering space may be formed by removing a portion of the sealing layer.

According to various embodiments, the gas outlet may include a third block portion separated from the second block portion by a second buffering space. The width of the first block portion is larger than the width of the second block portion, and the width of the second block portion is larger than the width of the third block portion. The widths of the first, second, and third block portions may be from about 1 mm to 6 mm.

According to various embodiments, the first block portion is formed closer to the receiving portion than the second block portion. A groove is formed in the first block portion, facing the receiving portion. The groove may have a trapezoidal cross-section, and the width of the junction portion may be from about 6 mm to 15 mm.

A rechargeable battery, according to another exemplary embodiment of the present invention, includes an electrode assembly, and a case including: a receiving portion to house the electrode assembly; a junction portion formed around the receiving portion, by bonding edges of the case; and a gas outlet disposed in the junction portion. The gas outlet includes a first block portion and a second block portion separated from the first block portion.

According to various embodiments, the width of the first block portion may be larger than the width of the second block portion. The gas outlet may include a third block portion separated from the second block portion. The gas outlet may be formed in the junction portion.

A rechargeable battery, according to another exemplary embodiment of the present invention, includes an electrode assembly, and a case including: a receiving portion to house the electrode assembly; a junction portion formed around the receiving portion; and a gas outlet formed in the junction portion, having a multiple block structure.

According to the various exemplary embodiments of the present inventions, gas is easily emitted from the case, so that safety of the rechargeable battery can be improved. In addition, the gas outlet has a multi-block structure, so that sudden gas-emission pressure changes can be buffered.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
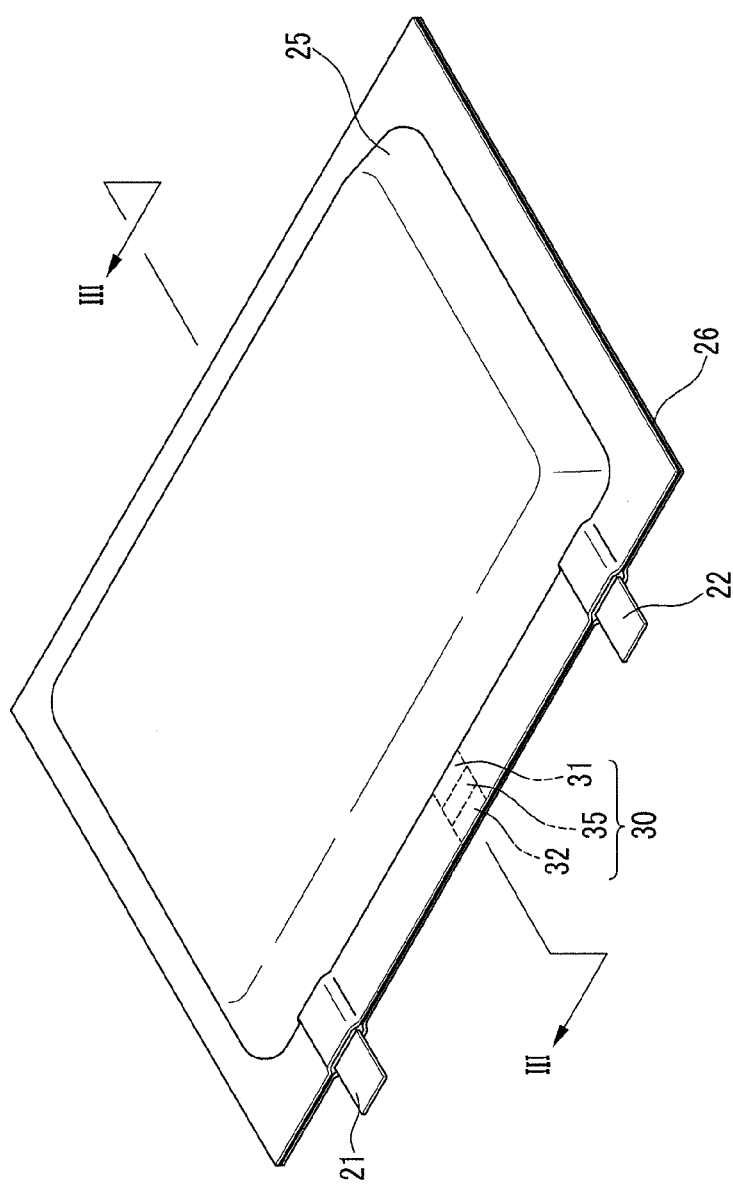
FIG. 1 is a perspective view of a rechargeable battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures. As those skilled in the art would realize, the described embodiments may be modified in various different ways, all without departing from the spirit or scope of the present invention.

Figure 2:
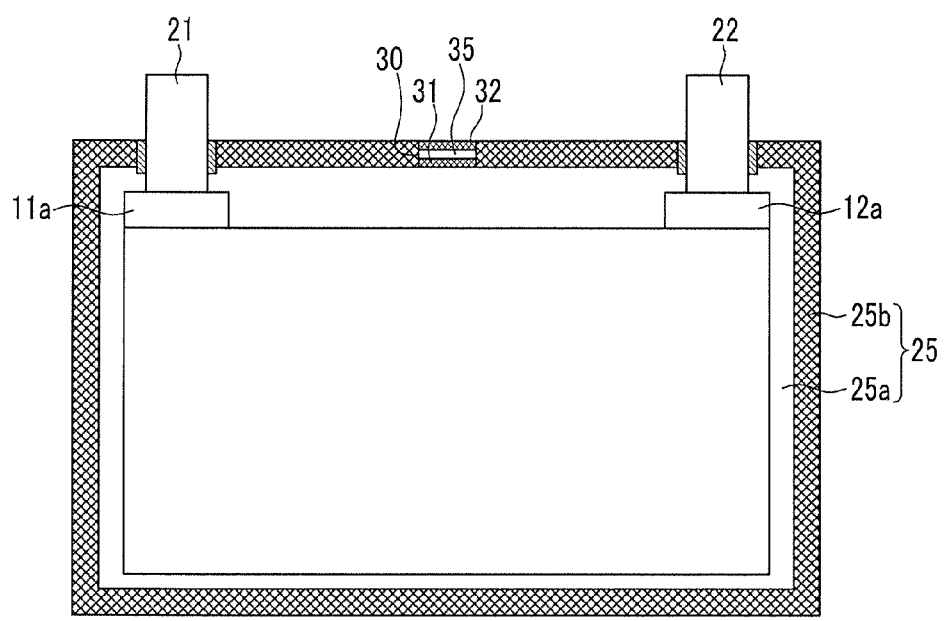
FIG. 2 is a top view of FIG. 1, with a film removed.
Figure 3:
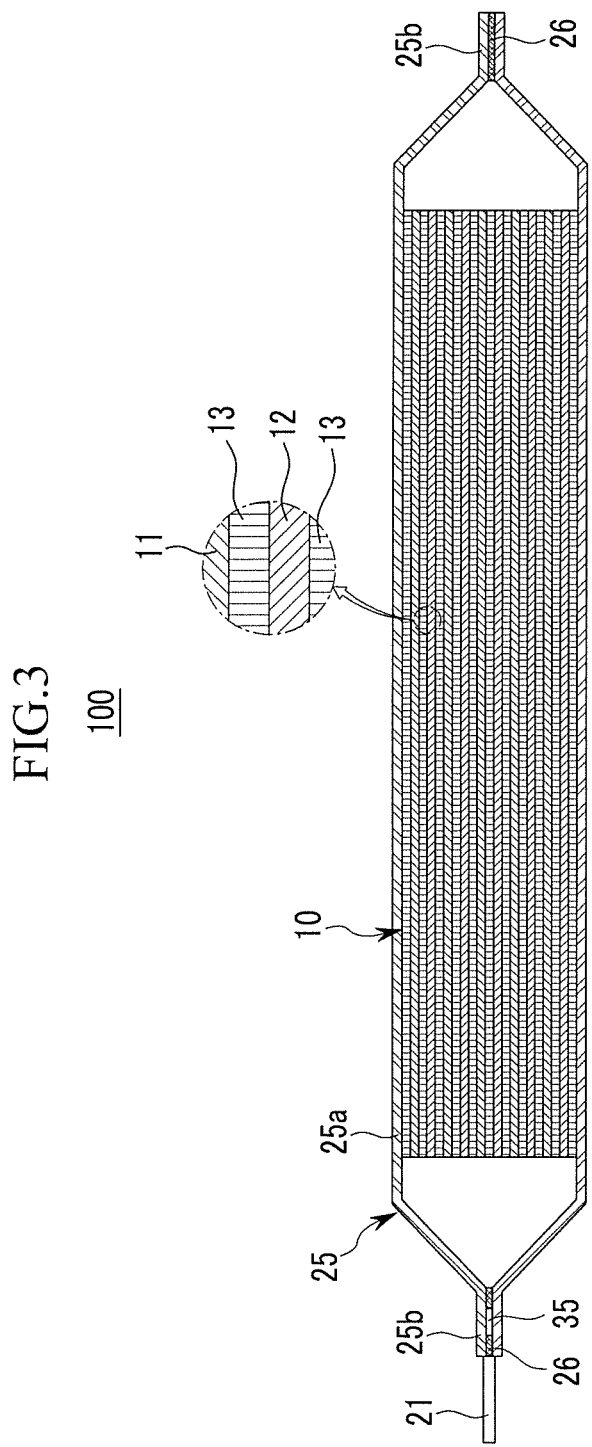
FIG. 3 is a cross-sectional view of FIG. 1, taken along the line III-III.

FIG. 1 is a perspective view of a rechargeable battery 100, according to an exemplary embodiment of the present invention, FIG. 2 is a top view of FIG. 1, with a film removed, and FIG. 3 is a cross-sectional view of FIG. 1, taken along the line III-III. Referring to FIGS. 1-3, the rechargeable battery 100 includes: an electrode assembly 10 having a positive electrode 11, a negative electrode 12, and a separator 13 interposed therebetween; a case 25 to house the electrode assembly 10; a positive terminal 21 electrically connected to the positive electrode 11; and a negative terminal 22 electrically connected to the negative electrode 12.

The positive electrode 11 includes a positive electrode current collector formed of a metal thin plate made of aluminum or the like, and a positive electrode active material layer formed on the positive electrode current collector. The negative electrode 12 includes a negative electrode current collector formed of a metal thin plate made of copper or the like, and a negative electrode active material layer formed on the negative electrode current collector. The electrode assembly 10 has a structure where a plurality of the positive and negative electrodes 11 and 12 are alternately laminated, while interposing the separators 13 therebetween. However, the present invention is not limited thereto. For example, the electrode assembly 10 may have a structure where the separator 13 is disposed between the positive and negative electrodes 11 and 12, and the resultant is wound.

Positive and negative electrode uncoated regions 11a and 12a are formed at one end of the electrode assembly 10. A first terminal 41 is welded to the positive electrode uncoated region 11a, and a second terminal 42 is welded to the negative electrode uncoated region 12a.

The positive electrode 11, the negative electrode, 12, and the separator 13 are formed as rectangular sheets. The separator 13 is interposed between the positive electrode 11 and the negative electrode 12, and provides a passage for ions, while insulating the positive and negative electrodes 11 and 12.

The case 25 is formed of upper and lower films that are laminated together. The case 25 includes a receiving portion 25a in which the electrode assembly 10 is located, and a junction portion 25b disposed around the receiving portion 25a, formed by bonding the edges of the films of the case 25. A rectangular sealing layer 26 is disposed in the junction portion 25b, to connect edges of the case 25.

A gas outlet 30 is formed in the junction portion 25b. The gas outlet 30 is interposed between the positive terminal 21 and the negative terminal 22, but the present invention is not limited thereto. In particular, the gas outlet 30 can be disposed anywhere in the junction portion 25b.

The gas outlet 30 is opened to release gas from the rechargeable battery 100, when the internal pressure of the rechargeable battery 100 is increased. The gas outlet 30 includes a first block portion 31, a second block portion 32, and a buffering space 35 separating the first and second block portions 31 and 32.

The first block portion 31 is provided closer to the receiving portion 25a than the second block portion 32. Accordingly, the first block portion 31, the buffering space 35, and the second block portion 32 are sequentially arranged, starting from the center of the rechargeable battery 100. Portions of the sealing layer 26 may form the first block portion 31 and the second block portion 32. The buffering space 35 may be formed by removing a portion of the sealing layer 26, such that upper and lower films in the junction portion 25b are separated by the buffering space 35.

A width W1 of the first block portion 31 is larger than a width W2 of the second block portion 32. When the internal pressure of the rechargeable battery 100 is increased, the first block portion 31 is separated to connect the internal portion of the rechargeable battery 100 with the buffering space 35. The first block portion 31 has lower bond strength than other portions of the junction portion 25b, because the smaller width W1 reduces the bonding strength thereof.

When the gas flows in the buffering space 35, the internal pressure of the rechargeable battery 100 is decreased, so that the rechargeable battery 100 can continue operations. When the internal pressure of the rechargeable battery 100 is increased again, the second block portion 32 is opened, so that the gas is emitted to the outside of the rechargeable battery 100. Since the width W2 of the second block portion 32 is smaller than the width W1 of the first block portion 31, the second block portion 32 is opened with a pressure that is lower than that of the first block portion 31.

When the gas outlet 30 is not provided, the weakest part of the junction portion 25b is broken. However, since it is difficult to determine where such a break will occur, it is difficult to predict a location/direction in which the gas is emitted. In addition, the gas emission pressure cannot be appropriately set, which may cause the rechargeable battery 100 to ignite or explode. However, according to the present exemplary embodiment, the gas can be emitted through the gas outlet 30, as a set pressure, in a predictable manner.

In addition, when a gas outlet is broken in a single operation, rather than being broken through several operations, a relatively large pressure must be applied for the gas to be emitted. Accordingly, a case may be excessively broken or an electrolyte solution may be emitted with the gas. When the electrolyte solution is emitted with the gas, the electrolyte solution may block an outlet path of the gas, and/or the emitted electrolyte solution may cause an external short circuit. Further, the emitted electrolyte solution may be ignited by an external structure having a high temperature.

In addition, in a case of a conventional structure, the moment that the rechargeable battery is opened the operation thereof is stopped. However, such an occurrence cannot be predicted and the rechargeable battery cannot be repaired in advance. Thus, the reliability of such case is reduced. This may cause a critical problem when the rechargeable battery is applied to an electric vehicle or other device. That is, if an electrical vehicle suddenly loses battery power, accidents are likely to occur. However, according to the present exemplary embodiment, a sensor can detect the opening of the first block portion 31, so that the rechargeable battery 100 may be repaired or an emergency action may be carried out, prior to power loss.

Figure 4:
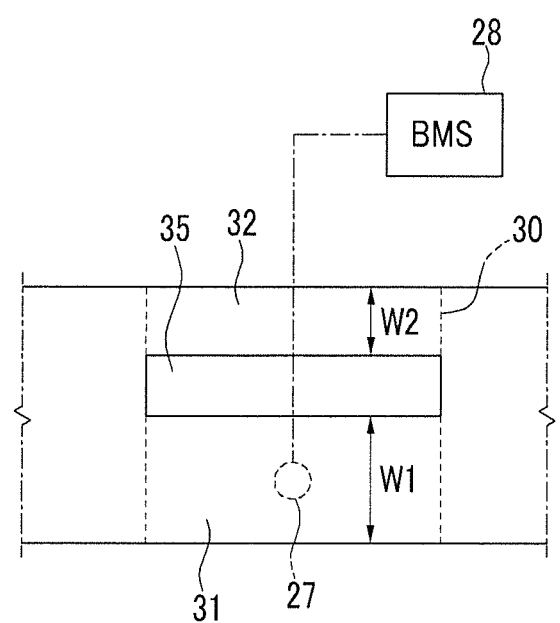
FIG. 4 is a schematic diagram of a gas outlet of the rechargeable battery of FIG. 1.

As shown in FIG. 4, an impact sensor 27 is connected to the first block portion 31. The impact sensor 27 generates a signal when the first block portion 31 is opened and transmits the signal to a battery management system (BMS) 28. The BMS 28 reports the opening of the first block portion 31 to a user, so the user can perform an appropriate action.

In addition, after the first block portion 31 is opened, the internal pressure of the rechargeable battery 100 is decreased, and then the second block 32 is opened. That is, opening of the first and second block portions 31 and 32 are sequentially performed and the pressure at the opening is reduced, so that excessive breakage of the case 25 and emission of the electrolyte solution can be prevented.

Figure 5:
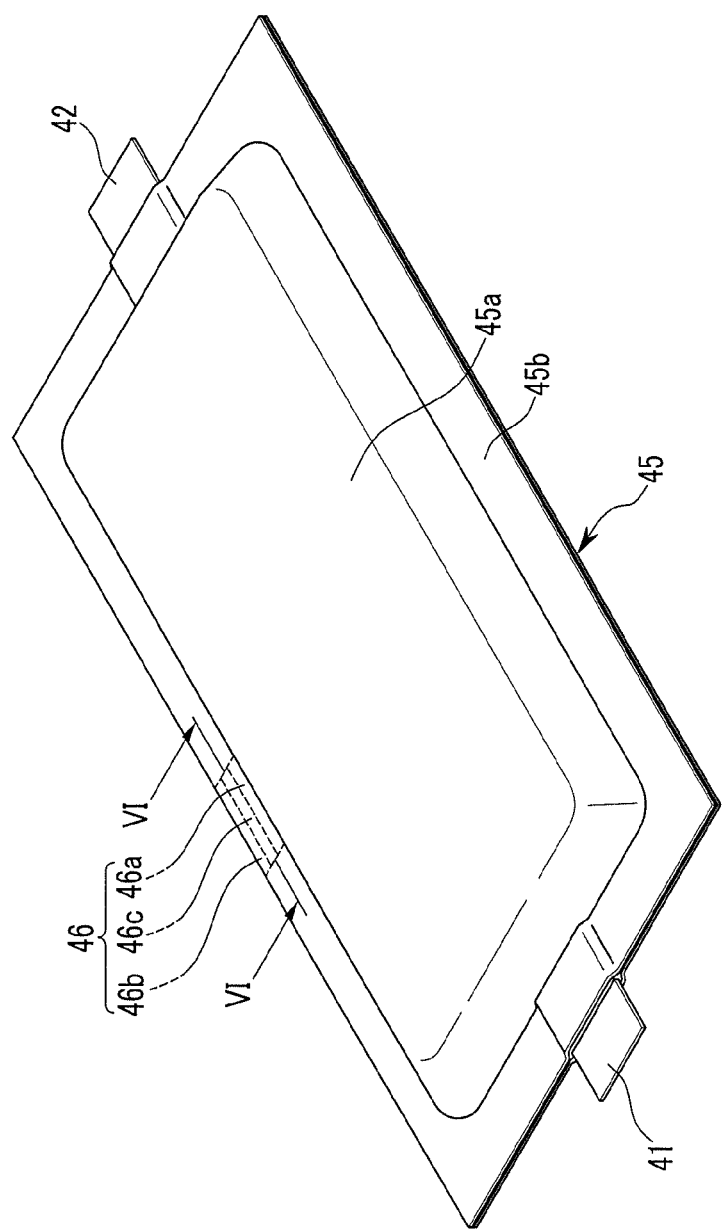
FIG. 5 is a perspective view of a rechargeable battery, according to an exemplary embodiment of the present invention.
Figure 6:
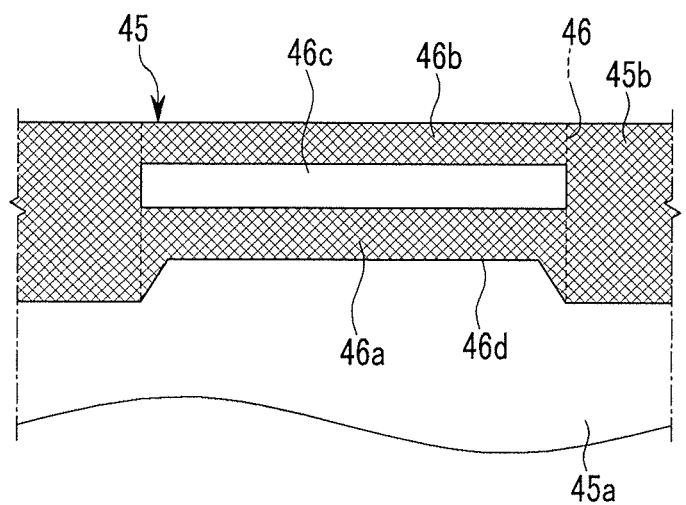
FIG. 6 is a top view of FIG. 5, taken along the line VI-VI with a film removed.

FIG. 5 is a perspective view of a rechargeable battery 101, according to another exemplary embodiment of the present invention, and FIG. 6 is a cross-sectional view of FIG. 5, taken along the line VI-VI. Referring to FIGS. 5 and. 6, the rechargeable battery 101 includes: an electrode assembly; a case 45 to house the electrode assembly; a positive electrode terminal 41 electrically connected with a positive electrode; and a negative electrode terminal 42 electrically connected with a negative electrode.

The rechargeable battery 101 is similar to the rechargeable battery 100, except for the case 45 and the structure of the terminals 41 and 42. Therefore descriptions of similar elements are omitted.

The case 45 is pouch-shaped and is formed films that are bonded together. The positive electrode terminal 41 protrudes from an end of the case 45, and the negative electrode terminal 42 protrudes from an opposing end of the case 45.

The case 45 includes a receiving portion 45a in which the electrode assembly is installed, and a junction portion 45b disposed around the receiving portion 45a. A gas outlet 46 is formed in the junction portion 45b. The gas outlet 46 includes a first block portion 46a, a second block portion 46b, and a buffering space 46c formed between the first and second block portions 46a and 46b. A sealing layer is disposed in the junction portion 45b, to bond the films of the case 45. Portions of the sealing layer form the first and second block portions 46a and 46b. A portion of the sealing layer may be removed to form the buffering space 46c, such that films are separated.

The first block portion 46a is disposed closer to the receiving portion 45a than the second block portion 46b. A trapezoidal groove 46d is formed in the first block potion 46a, adjacent to the receiving portion 45a. The groove 46d forms a space separating the films of the case 45, in junction portion 45b.

Figure 7A:
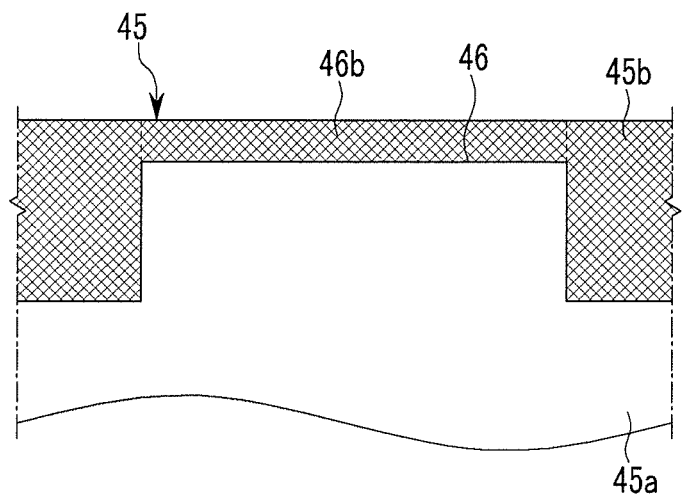
FIG. 7A and FIG. 7B show processes for opening the gas output of the rechargeable battery of FIG. 5.
Figure 7B:
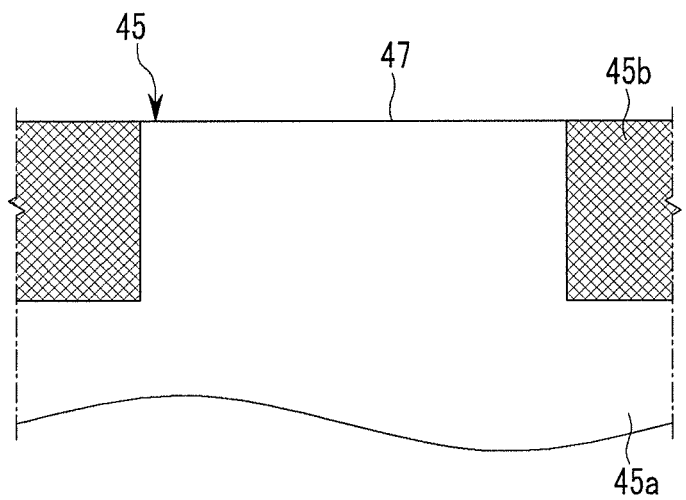

As shown in FIG. 7A, when the internal pressure of the rechargeable battery 101 is increased, the first block portion 46a is opened, so that the buffering space 46c and the receiving portion 45a are connected. In addition, as shown in FIG. 7B, when the internal pressure is increased after the first block portion 46a is opened, the second block portion 46b is opened, so that a gas outlet path 47 is formed.

Figure 8:
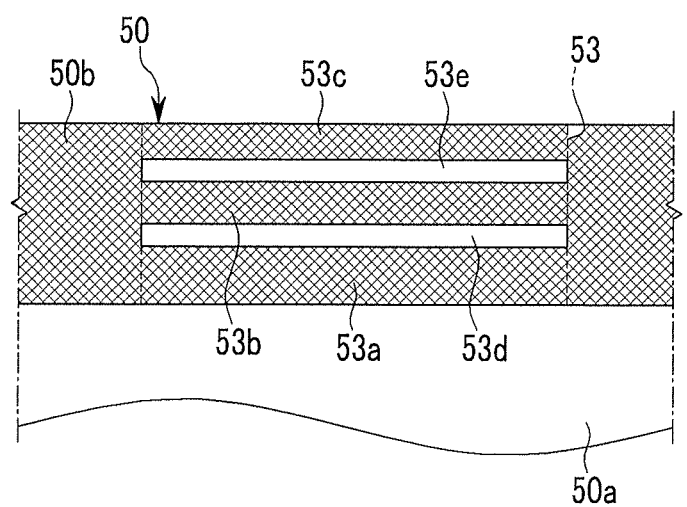
FIG. 8 is a cross-sectional view of a case of a rechargeable battery, according to an exemplary embodiment of the present invention.

FIG. 8 is a partially cross-sectional view of a gas outlet 53 of a case 50 of a rechargeable battery, according to another exemplary embodiment of the present invention. Referring to FIG. 8, the rechargeable battery is similar to the rechargeable battery 100, except for the structure of the gas outlet 53. Therefore descriptions of similar elements are omitted.

The case 50 includes a receiving portion 50a in which an electrode assembly is installed, and a junction portion 50b formed along the edges of the receiving portion 50a. The junction portion 50b may include a sealing layer and connects films of the case 50. The gas outlet 53 is formed in the junction portion 50b. The gas outlet 53 includes a first block portion 53a, a second block portion 53b, a third block portion 53c, a first buffering space 53d formed between the first and second block portions 53a and 53b, and a second buffering space 53e formed between the second and third block portions 53b and 53c.

The first, second, and third block portions 53a, 53b, and 53c are formed from a sealing layer that adheres the films of the case 50. A sealing layer is not formed in the first and second buffering space 53d and 53e. The first and second buffering spaces 53d and 53e may be formed by removing portions of the sealing layer in the junction portion 50b/gas outlet 53. According to some embodiments, the first, second, and third block portions 53a, 53b, and 53c are formed using separate sealing layers.

Figure 9:
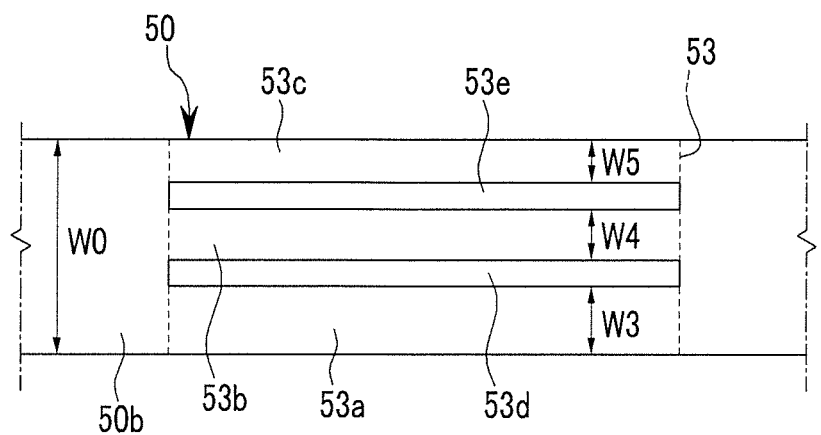
FIG. 9 is a schematic diagram of a gas outlet of the rechargeable battery of FIG. 8.

Referring to FIG. 9, a width W0 of the junction portion 50b may be from about 6 mm to 15 mm. Widths W3, W4, and W5 of the first, second, and third block portions 53a, 53b, and 53c may be from about 1 mm to about 6 mm. The width W3 of the first block portion 53a is larger than the width W4 of the second block portion 53b. The width W4 of the second block portion 53b is larger than a width W5 of the third block portion 53c and is smaller than the width W3 of the first block portion 53a.

As described, the gas outlet 30 has three block portions 53a, 53b, and 53c and two buffering spaces 53d and 53e, so that it may be opened through three steps. That is, as shown in FIG. 9A, when the internal pressure of the rechargeable battery is increased, the first block portion 53a is opened, so that the receiving portion 50a and the first buffering space 53d are connected. When the rechargeable battery is increased again, the second block portion 53b is opened, so that the receiving portion 50a and the second buffering space 53e are connected. Further, when the internal pressure of the rechargeable battery once more, the third block portion 53c is opened, so that a gas outlet path is formed.

The structure of the gas outlet 53 allows for a reduction in the opening impact of the gas outlet 53. In addition, maintenance and emergency actions can be easily performed, by sensing the opening of any of the block portions 53a, 53b, and 53c. Since the block portions 53a, 53b, and 53c are sequentially opened, at different times, an opening time difference can be set according to the purpose of opening. That is, the opening time difference may set to be large to permit emergency battery operations, and the block portions may be set to be almost simultaneously opened, in order to minimize opening impact. In other words, the amount of pressure at which each of the block portions 53a, 53b, and 53c opens can be set individually.

The opening time difference may be changed by changing the widths of the second and third block portions 53b and 53c. That is, when the widths of the second and third block portions 53b and 53c are small, the second and third block portions 53b and 53c are opened with a short time difference, when the first block portion 53a is opened. In this case, the second and third block portions 53b and 53c reduce the opening impact, to prevent emission of internal materials to the outside.

When the widths of the second and third block portions 53b and 53c are relatively large, the second and third block portions 53b and 53c are not opened for a predetermined time period after the first block portion 53a is opened, so that an emergency action may be carried out, by sensing this with a sensor.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:
1. A rechargeable battery comprising:
an electrode assembly;

a case including a receiving portion to house the electrode assembly, and a junction portion including a sealing layer and disposed around the receiving portion, to connect edges of the case; and a gas outlet formed in the junction portion, including a first block portion, a second block portion, and a buffering space formed between the first and second block portions, wherein the buffering space is completely surrounded by the edges of the case and the first and second block portions on only one side of the electrode assembly, and wherein the case comprises films bonded together at the junction portion, the first block portion, and the second block portion.

2. The rechargeable battery of claim 1, wherein widths of the first block portion and the second block portion in a direction from an inner edge of the gas outlet toward an outer edge of the gas outlet are different.

3. The rechargeable battery of claim 1, further comprising a sealing layer disposed in the junction portion, wherein portions of the sealing layer form the first and second block portions.

4. The rechargeable battery of claim 2, wherein the buffering space is formed by removing a portion of the sealing layer.

5. The rechargeable battery of claim 3, wherein the gas outlet further comprises a third block portion and a second buffering space between the second and third block portion, and wherein the width of the first block portion is larger than the width of the second block portion, and the width of the second block portion is larger than a width of the third block portion.

6. The rechargeable battery of claim 5, wherein widths of the first, second, and third block portions are from about 1 mm to about 6 mm.

7. The rechargeable battery of claim 1, wherein the gas outlet extends from the receiving portion to an outer edge of the junction portion.

8. The rechargeable battery of claim 7, wherein the first block portion is disposed closer to the receiving portion than the second block portion, and a groove is formed in the first block portion, facing the receiving portion.

9. The rechargeable battery of claim 8, wherein the groove has a trapezoidal cross-section.

10. The rechargeable battery of claim 1, wherein a width of the junction portion is from about 6 mm to about 15 mm.

11. The rechargeable battery of claim 1, further comprising a sensor to detect a rupture in the first block portion, wherein the first block portion is disposed closer to the receiving portion than the second block portion.

12. A rechargeable battery comprising:

an electrode assembly;

a case including a receiving portion to house the electrode assembly, and a junction portion disposed around the receiving portion; and a gas outlet disposed in the junction portion, including a first block portion, a second block portion separated from the first block portion, and a buffering space formed between the first and second block portions, wherein the buffering space is completely surrounded by edges of the case and the first and second block portions on only one side of the electrode assembly, and wherein the case comprises films bonded together at the junction portion, the first block portion, and the second block portion.

13. The rechargeable battery of claim 12, wherein a width of the first block portion is larger than a width of the second block portion.

14. The rechargeable battery of claim 12, wherein the first and second block portions extend in parallel.

* * * * *